3,485,736
METHOD OF ISOELECTRIC FRACTIONATION
Olof Alfred Yngve Vesterberg, Syrenvagen 1,
Solna, Sweden
No Drawing. Filed Aug. 19, 1965, Ser. No. 481,120
Claims priority, application Sweden, Aug. 26, 1964,
10,273/64
Int. Cl. B01k 5/00
U.S. Cl. 204—180          4 Claims

ABSTRACT OF THE DISCLOSURE

Carrier ampholyte mixture having isoelectric points within a pH spectrum of between about 3 to 11 is produced. The mixture is effective in fractionation and analysis of high molecular ampholytes by stationary electrolysis. The mixture is produced by reacting a low molecular weight organic nitrogen base with unsaturated carboxylic acid in an amount insufficient to cause saturation of the nitrogen atoms in said organic base. The compounds of the resulting mixture are characterized by the absence of peptide bonds.

---

The present invention relates to a system of carrier ampholytes suitable for use in isoelectric fractionation of high molecular ampholytes (particularly proteins, including toxines, antitoxines, bacterial antigenes, antibodies, virus, hormones, enzymes, etc.) by stationary electrolysis (i.e. electrolyses carried out convection-free for such a long time that no substance is any longer subjected to substantial concentration changes in the electrolysis cell), and to a process of producing such systems of carrier ampholytes.

The method for characterizing and fractionating ampholytes by means of stationary electrolysis was discovered by Williams and Waterman (Proc. Soc. Exp. Biol. Med. 27, 56–59, 1929). Their line of thought was a simple further development of the known fact that pure sodium hydroxide and pure sulphuric acid can be obtained by electrolysis of sodium sulphate, provided that alkali formed at the cathode and acid formed at the anode are not recombined by convective mixing. The same applies to other acids and bases which are resistant against anodic oxidation and cathodic reduction. If, in the same way, there is made a convection-free electrolysis of a mixture of ampholytes, Williams and Waterman argued, the result must be that the more acid ampholytes at stationary equilibrium, are accumulated nearer the anode, the more basic ampholytes nearer the cathode. As each ampholyte tends to bring the pH of the solution towards its own isoelectric point, the result will be that the current by its electrolysis action forms a pH gradient with pH increasing from anode to cathode. The course which pH describes between the electrodes depends upon the amounts and the electrochemical properties of the electrolytes in the system.

Williams and Waterman have had many followers, and their process has been of great importance in the fractionation of biologic material, especially lower peptides and amino acids obtained by hydrolysis of proteins. None has, however, found the method to be particularly selective in its capacity of resolving ampholytes with closely spaced isoelectric points. Its importance therefore became limited to separation of ampholytes in three main groups: acid, neutral and basic ampholytes. Tiselius came to the same conclusion about very limited usefulness when he tested the process on a mixture of proteins (Svensk Kemisk Tidskr. 53, 305, 1941). Two so different proteins as egg albumin (isoelectric point, pI=4.6) and hemoglobin (pI=7.0) which are very easy to separate with other methods, could not be completely separated by stationary electrolysis, each could only be enriched per se.

Explanations of these facts were given by Svensson (Acta Chem. Scan. 15, 325, 1961) who showed in a theoretical analysis that in a stationary pH gradient formed by electric current no ampholyte can exist anywhere in pure condition if one has started from a mixture. Each ampholyte is, even at its own concentration maximum, contaminated at least by ampholytes having adjacent isoelectric points. It was furthermore shown that the grade of the concentration of an ampholyte within a narrow zone is better the lower the diffusion constant is and the higher the value of the derivative $du/d$ (pH) is at the isoelectric point ($u$=ion mobility). It is now known that most amino acids and lower peptides have high diffusion constants and lower values of said derivative at the isoelectric point, and hence it may be concluded that there are no theoretical possibilities for fine separation of low molecular ampholytes by stationary electrolysis.

On the other hand, it is known that proteins and other high molecular ampholytes have low diffusion constants and high values of the derivative $du/d$ (pH) at the isoelectric point. Svensson concluded from this that it ought to be possible to develop the process to a very selective analysis and fractionation process for proteins provided that there could be obtained a pH gradient stable in time and sufficiently protracted extending over the isoelectric points of the protein system. The latter condition can be satisfied by using certain types of low molecular ampholytes which thus must be present simultaneously at the electrolysis. By this the concept carrier ampholyte was created, and such a one thus means an ampholyte which at electrolysis together with other similar ampholytes is capable of causing a slowly variable pH between the electrodes and furthermore a moderately varying conductance. The latter requirement is connected with the desire to have a not too strongly varying field strength which is in inverse ratio to the conductance. The carrier ampholytes make it possible for the proteins to separate completely from each other, and the last step in the process is to separate each purified protein from carrier ampholytes, which is easily carried out by dialysis or some other procedure which is based upon difference in the molecule size. In special cases there may, of course, be other methods which admit of a more comfortable separation of the carrier ampholytes.

In a second work (Acta Chem. Scand. 16, 456 (1962)), Svensson has further developed the demands to be made on a carrier ampholyte beyond the demand that it shall be easily separable from the substances subject to separation. This investigation resulted in a new, more easily comprehensible and more useful definition of a carrier ampholyte. According to this definition a low molecular ampholyte is a good carrier ampholyte if it has at least two $pK_s$-values near the isoelectric point (pI) of the ampholyte. Thus, histidine with pI=7.6 and nearest $pK_s$-values at 6.10 and 9.18 is a good carrier ampholyte, whereas glycine with pI=6.1 and nearest $pK_s$-values at 2.35 and 9.78 is a poor carrier ampholyte (like all other neutral amino acids). The making of an inventory of commercially available low molecular carrier ampholytes showed that there is none which is isoelectric between pH 4 and 7 and that there are only two which are isoelectric between pH 7 and 8, and that there are only a few which are isoelectric above pH 8. Some of the commercially available carrier ampholytes are very expensive, which strongly limits the usefulness of the method, but still more it is, of course, limited by the fact that within certain pH-regions there are no commercial carrier ampholytes at all.

In a third work (Arch. Biochem. Biophys., Supp. 1,132, 1962) Svensson has shown that fine separation of proteins which are isoelectric within pH-regions where good carrier ampholytes are available, is experimentally possible, quite in accordance with theoretical expectations. It could be shown that two proteins with isoelectric points at a distance from each other of only 0.1 pH-unit can be completely separated from each other, a result which has been later confirmed and surpassed by means of the present invention.

For the pH-region between 0 and 3 no carrier ampholytes are necessary because a useful pH-gradient covering this region can be obtained by electrolysis of a system of acids of different strength (from strong acids to very weak acids). The same applies to the pH-region between 11 and 14 which can be mastered by using a system of bases of different strength. The majority of proteins are, however, isoelectric between pH 3 and 11. In order to be able to separate them satisfactorily, there is, according to the above facts, required a system of carrier ampholytes the isoelectric points of which lie scattered and rather evenly distributed between pH 3 and 11. There is hardly any exaggeration to say that the actual analysis and separation method for proteins is entirely dependent upon the access to such a system of carrier ampholytes.

Hitherto one has tried to manage the shortage of carrier ampholytes in two fundamentally different ways, viz firstly by organic-chemical synthesis of individual carrier ampholytes, secondly by partial hydrolysis of proteins carried out in such a way that the hydrolysis product substantially consists of lower peptides.

The first method is strongly impeded by the fact that most of the easily available organic protolytes have $pK_s$-values lying gathered in certain narrowly limited pH-regions. Thus, almost all monovalent carboxylic groups dissociate between pH 4 and 5, almost all monovalent aliphatic amines between pH 9 and 10, most of the aromatic amines at pH about 5, et cetera. To produce by synthesis individual "tailor-made" carrier ampholytes with isoelectric points where they are desired, is very difficult also for a skilled synthetist. Synthesis tests hitherto made have not led to any great successes, either, and one can say with certainty that such synthetic products would be rather expensive.

The second method has led to greater successes since partial hydrolysates of proteins after desalting have proved to contain considerable amounts of useful carrier ampholytes. As distinguished from the above discussed synthetic method the partial hydrolysis of proteins directly gives the mixture, the system of carrier ampholytes which is necessary for isoelectric fractionation of proteins. This is an advantage because thereby one is spared from time-consuming and expensive recrystallizations and other purifying processes for chemical individuals. Partial hydrolysates of proteins have been of great importance for the further development of the stationary electrolysis and have made possible a number of very beautiful protein separations in the isoelectric way.

The fact that the art still cannot be quite satisfied with partial hydrolysates of proteins as carrier ampholytes depends upon the following facts which have not been dealt with as yet. That fraction of a partial hydrolysate which is isoelectric between pH 5 and 6.5 is, although great as to the quantity, bad in its carrier ampholyte properties. Thus, at electrolysis it gives a very low conductance within this pH interval, with local overheating within the interval and too low field strength outside the same as a consequence. Another disadvantage of the partial hydrolysates is that they seldom can be made quite colourless. Therefore, the carrier ampholytes give rise to coloured zones, which is disadvantageous in isoelectric separation of coloured proteins (e.g. hemoglobins, myoglobins).

The latter fact is only one aspect of a general demand which one should very much like to make upon a system of carrier ampholytes, but which it has not as yet been possible to satisfy. In isoelectric works with proteins it is not enough to bring the electrolysis to completion, i.e., to a stationary state; it must also be possible to localize the protein after the electrolysis and to measure quantitatively the amount of protein which has been accumulated at different points between the electrodes. For this reason it is highly desirable that the system of carrier ampholytes does not interfere with the used analysis method for proteins. Naturally a system of peptides gives positive reaction for the great majority of the analysis methods which can be used for proteins. Only coagulation processes and specific protein reactions (enzyme activity, antigene activity, toxic activity, antibody function, et cetera) can be used in the presence of carrier ampholytes consisting of peptides. For all other kinds of protein analysis the peptides must first be removed. In most cases this can, to be sure, take place by dialysis, which is simple but time-consuming, especially as rather great peptides meanwhile present dialyse out very slowly. The most simple, comfortable and most general protein analysis method consists in measuring extinction at 2800 A. It has therefore long been a desire for a system of carrier ampholytes that it shall be transparent for light of this and of higher wave lengths. The partial hydrolysates do not satisfy this desire in any way.

According to the invention there is provided a system of carrier ampholytes comprising a composition of polyprotic amino carboxylic acids, each containing at least four weak protolytic groups, at least one being a carboxylic group and at least one a basic nitrogen atom, but no peptide bonds. The composition is characterized firstly in that it contains a great number, i.e., at all events at least three different chemical individuals which mutually differ from each other in the number of acid and basic groups or, when their number is equal, are each others' isomers and homologues, secondly in that each chemical individual contains at least 4, preferably 4 to 10 weak protolytic groups. A preferential composition according to the invention contains no ampholytes with aromatic nuclei, but only substances of aliphatic or alicyclic character. Such a product has no light absorption at 2800 A. or thereabove and is consequently especially suitable for works with protein systems which must be analyzed by means of UV-absorption.

As the composition contains a great number of different ampholytes with weak protolytic groups, it will show a very rich spectrum of different isoelectric points within the pH region between 3 and 11, a necessary property of a system of carrier ampholytes. Due to the polyprotic character of the individual ampholytes furthermore of them will get good carrier ampholyte properties. This is evident from the following.

It is well known from physical organic chemistry that two protolytic groups within the same molecule strongly influence each others' dissociation. This mutual influence has always the effect that the $pK_s$-distance in a biprotic molecule becomes greater than could be expected without mutual influence. This is one of the reasons why the attempts of synthetizing biprotic carrier ampholytes have not led to the desired result. The repelling effect between the different $pK_s$-values of a protolyte is not limited to different protolytic groups which in fact is present in a biprotic ampholyte; it holds true to the equal or to a still higher degree, between identical protoltic groups within the same molecule. Thus, it is a theoretical impossibility for the $pK_s$-values of a bivalent acid or a bivalent base to lie closer to each other than 0.6 pH-units, and as a rule they lie at a many times greater distance. This is evident from the below examples. The $pK_s$-values apply at 25° C.

|  | pK₁ | pK₂ | pK₃ | pK₄ | pK₅ |
|---|---|---|---|---|---|
| Ethylene diamine | 6.85 | 9.9 | | | |
| Diethylene triamine | 4.34 | 9.13 | 9.94 | | |
| Triethylene tetramine | 3.32 | 6.67 | 9.20 | 9.92 | |
| Tetraethylene pentamine | 2.65 | 4.25 | 7.87 | 9.08 | 9.92 |

From organic compounds with amino and/or imino groups there can be obtained a plurality of homologues and isomers with different $pK_s$-values introducing substituents on the nitrogen atom. For example, different ethanol amines with different $pK_s$-values can be simply produced. The influence of the ethanol group on the $pK_s$-value for the amino group is evident from the following homologue series:

$pK_s$ (25° C.)
Monoethanol amine _____ 9.5
Diethanol amine _____ 9.0
Triethanol amine _____ 7.9

According to the present invention it has appeared that this described physical-chemical fact can be practically utilized by giving the molecules at least 4 and preferably up to 10 weak protolytic groups. By this a crowding can be obtained on the pH-scale for the different dissociation steps, and a couple of $pK_s$-values in the vicinity of the isoelectric point are forced upon the ampholyte, which is almost impossible to reach for bi-and triprotic ampholytes which are isoelectric between pH 4 and 7.

The invention also comprises compositions of polyprotic ampholytes the isoelectric points of which are distributed within narrower pH-regions than the mentioned one between pH 3 and 11. Such preparations, preferably extending over pH-regions of only 2 to 3 pH-units, sometimes even only 1 pH-unit, are very useful for ultrafine separation of proteins with very closely spaced isoelectric points, e.g. system of antibodies, hemoglobins, myoglobins, et cetera. In stationary electrolysis of an ampholyte composition with isoelectric points between pH 6 and 8 there is obtained (without secondary effects) an anodic pH of about 6 and a cathodic pH of about 8, and therefore the volume of the whole electrolysis cell becomes available for separations within this narrow pH interval.

The described system of carrier ampholytes satisfies all demands which reasonably can be made upon such a system. It comprises individual ampholytes, the isoelectric points of which lie well scattered within the pH-range which cannot be mastered by means of systems of acids and systems of bases. Their buffering capacity and electric conductance in isoelectric state are satisfactory. They are colourless and show at 2800 A. only an insignificant light absorption. Nor do they disturb any other usually used analysis method for proteins. As will be described below, also the starting materials for the production of the system are inexpensive, and the method of production is not very expensive.

None of the individual carrier ampholytes in the system is commercially available on the chemical market. The present invention therefore also comprises a process for producing the compositions mentioned. The process is synthetic to its character, but has it in common with the method for producing partial hydrolysates that it directly gives a whole system of carrier ampholytes. It is, thus not the question of synthetic methods for pure chemical individuals and subsequent mixing together of known amounts of such individuals because such products would become absurdly expensive.

The present carrier ampholyte mixture is produced according to the invention preferably by reacting a low molecular weight organic compound having at least two primary and/or secondary nitrogen atoms with an acid containing at least one carbon-carbon-double bond.

The low molecular weight organic nitrogen base has suitably a molecular weight of 500 at most, preferably 300 at most. It can be substituted at one or more of the nitrogen atoms, e.g. with methyl, ethyl, ethanolamino and hydroxyl. In this organic nitrogen compound there are between two of the nitrogen atoms suitably three at most, preferably two carbon atoms. Thus, the compound should contain the structure

—NH—R—NH— in which R stands for —(CH₂)₃ or preferably

—CH₂—CH₂—

The used amine should, moreover, show at least a $pK_s$-value which is less than 8. The used amine is preferably aliphatic, and especially suitable amines are ethylene diamine, diethylene triamine, triethylene tetramine, tetraethylene pentamine and pentaethylene hexamine. Yet, the amine may be alicyclic and also heterocyclic, or contain aromatic groups, whereby, however, in these latter cases the produced carrier ampholyte mixture often shows light absorption in the critical range at 2800 A. The amines may also with advantage be used in mixture, whereby also one or more monoamines may be contained in the mixture.

The unsaturated acid used according to the invention preferably contains only a single double bond and preferably ten carbon atoms at most. The double bond preferably should be in α,β-position. The acid preferably is an unsaturated aliphatic acid, and acrylic acid, methacrylic acid and crotonic acid have proved to be suitable acids. The acid may also contain more than one carboxylic group, e.g. maleic acid and itaconic acid. Several unsaturated carboxylic acids may also be used at the same time.

The reaction between amine and acid can, in a typical case, be illustrated by the following reaction formula:

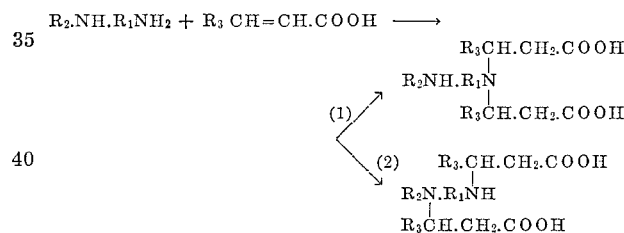

in which $R_1$ is a bivalent group which may contain one or more nitrogen atoms, e.g. an alkylene group or

—(CH₂)ₙ·NH·(CH₂)ₙ—

$R_2$ is a monovalent group, such as hydrogen or an alkyl group which may contain one or more nitrogen atoms, e.g. CH₃·NH·(CH₂)₂—, and $R_3$ is an alkyl group in which $n$ is a whole number with the value 1–5, for example. The indicated alternative reactions (1) and (2) take place at the same time and the number of possible combinations increases essentially with the number of primary and/or secondary nitrogen atoms in the starting amine and the number of carboxylic groups which are added.

An organic nitrogen base can additively couple one or more unsaturated carboxylic acids, the number of carboxylic acid molecules per molecule nitrogen base corresponding at most to the number of nitrogen-bound hydrogen atoms in the nitrogen base by suitable selection of the molar amount of nitrogen base and acid a statistic distribution of products is obtained which constitute an homologue series with different numbers of carboxylic groups and thus different pI-values.

Furthermore, at a given number of acid and basic groups there is spontaneously formed a great number of isomers partly due to the fact that the addition can be made to any of the two carbon atoms at the double bond in the unsaturated acid, partly due to the fact that the acid can be coupled to amino or imino groups located in different places in the molecule, which in part is evident from the above reaction formula. This is of particular importance for carboxylic and amino and imino groups respectively act upon each other in such a manner that different $pK_s$-values are obtained in different positions. It is evident that the isomer possibilities strongly increase with the number of protolytic groups.

The reaction is carried out with a smaller amount of acid than the one which is required for saturating all primary and secondary nitrogen atoms, in order that a suitable mixture of different amino carboxylic acids and isomers thereof shall be obtained. The reaction between polyamine and unsaturated carboxylic acid is preferably carried out at elevated temperature and suitably in the presence of a solvent. The reaction temperature is usually held at 30–150° C., preferably 40–100° C. When solvents are used, the reaction is often carried out by refluxing of the solvent. The solvent can be water or an organic solvent, e.g. an alcohol or a hydrocarbon. The reaction can be carried out by means of catalysts, among which may be mentioned bases, acid reacting salts, such as primary sodium phosphate, zinc chloride, aluminium chloride. Hydrochinone is used as inhibitor for the polymerization of the unsaturated acid.

In the present process there are generally formed ampholytes the pI of which show a spectrum between pH 3 and 10. This can be explained partly by the different number of carboxylic groups, partly by the different position of these carboxylic groups, in the molecule. The variation arises spontaneously and there is thus at the same time formed a great number of homologues and isomers.

In isoelectric separation one is often interested in a certain pH-interval which is selected with respect to the isoelectric points for the substances, especially proteins, which it is desired to test and separate. The used carrier ampholyte mixture should therefore with its pI-spectrum cover this interval and it is therefore often suitable to coarsely divide and separate the carrier ampholyte mixture produced according to this process with respect to pI. This division can be made by isoelectric separation, preferably in a device with a number of cells separated by convention preventing diaphragms (e.g. substantially according to Williams and Waterman, loc. cit.). The carrier ampholyte mixture produced according to the present invention and divided into different pI-intervals can be dried or crystallized. This method of division is also suitable when determining the yield of carrier ampholytes in a certain pI-interval. Guided by this determination the reaction can be modified in such a manner that a greater share of the total yield is obtained within a certain pI-region. This is made for instance by varying the relative amounts of amine and carboxylic acid, the amount and type of catalyst, and solvent.

When the carrier ampholyte mixture produced according to the present process has been divided with respect to pI and has been dried, its usefulness as carrier ampholyte mixture can be determined by measuring its buffering capacity and conductance, these values preferably being referred to mg. dry ampholyte mixture. The ampholytes produced according to the present process are divided in the mentioned electrolysis in a bath in such a manner that those with lower pI (the more acid ones) at equilibrium are located nearer the anode and those with higher pI nearer the cathode. The concentration distribution in equilibrium state where each ampholyte has a concentration peak at the pI of the ampholyte, resembles normal distribution curves (gauss curves) partially overlapping each other. At equilibrium the pH-value in a certain section of the electrolyses bath is thus about equal to pI for those ampholytes which are present in this section. A measuring of pH thus gives in a simple way a measure of the pI of the ampholyte.

The invention will be described hereinafter in detail with reference to the following example.

EXAMPLE

A round flask provided with reflux cooler, stirrer, thermometer and drop funnel was charged with 100 molar parts of triethylenetetramine of purum quality in a 50% aqueous solution. The flask was immersed in a water bath with the temperature 50° C. Through the funnel there was added in small portions a 50% aqueous solution of acrylic acid, purified in advance by vacuum distillation and containing 1% of hydrochinone. The total amount of acrylic acid was in different partial tests 200, 250, 300 and 350 molar parts. The additions were made in such a manner that the temperature in the flask did not exceed 65° C. (exothermic reaction). After the whole amount of acrylic acid has been added, a fraction of 0.5 ml. was taken out from the reaction mixture. This fraction was dissolved in 10 ml. of water for pH-measurement. This aqueous solution was thereafter acidified with hydrochloric acid to pH about 2 and was extracted with ether. The ether was evaporated and the residue titrated on double bonds with a $KMnO_4$-solution. This gave a measure of how great amount of acrylic acid had not coupled. In order to finish the reaction the flask was heated under stirring and held at 80–100° C. for 2–6 hours till the mentioned test of acrylic acid became negative.

For a closer study of the results of the coupling reaction the carrier ampholyte mixture obtained was divided in an electrolysis apparatus with 20 cells separated by diaphragms. In the electrolysis apparatus was introduced an amount of reaction mixture corresponding to about 40 g. of carrier ampholyte which has been dissolved in about 450 ml. of distilled water. In order that the ampholytes shall not be destructed by anode oxidation and cathode reduction respectively it is important to carry out the electrolysis in such a manner that the ampholytes contact the anode and the cathode as little as possible.

The electrolysis is carried out at a voltage of 400–800 volts, corresponding to an average field strength of 20–40 volt/cm., an equilibrium state being reached, as a rule within 48 hours, at which the current intensity does not change when the voltage is maintained constant.

The cells in the electrolysis apparatus are now emptied at the same time each into its individual vessel. A number of fractions corresponding to the number of cells is thereby obtained. The pH of the individual fractions is measured. The obtained pH values approximately correspond to the pI of the ampholytes. Fractions with pH within suitable intervals are combined and evaporated to dryness. The residue is thereafter dissolved in boiling methanol or ethanol. The solvent is evaporated whereby the ampholytes often crystallize. If this does not take place, the treatment is repeated in order to remove all water. The obtained residues are thereafter dried in a desiccator. The yield within the different pH-intervals is determined by weighing the dried ampholytes. The buffering capacity and conductance of the ampholytes is measured and converted into mg. dry substance.

At the tests it was found that >90% of the total yield of ampholyte has pI between 3.5 and 10. The obtained ampholytes have thus pI within the whole region of interest to the isoelectric separation method. It is also possible to modify the yield within a certain pI-region.

The carrier ampholyte mixture produced in this example is practically colourless. Its light absorption at 2800–2850 A. can be neglected in comparison with the absorption of the proteins.

Triethylene tetramine can be replaced by ethylene diamine, diethylene triamine or tetraethylene pentamine. The acrylic acid can in the same manner be replaced by methacrylic acid, crotonic acid, maleic acid, fumaric acid, itaconic acid, similar results being obtained.

According to the present process there are thus obtained in a simple and inexpensive manner good carrier ampholytes in a good yield; pI of these ampholytes show a spectrum which covers the field use of the isoelectric separation method.

What I claim is:
1. In a process for isoelectric fractionation and analysis of high molecular ampholytes by stationary electrolysis, the improvement which comprises performing said electrolysis in the presence of a carrier ampholyte mixture of at least three polyprotic amino carboxylic acids with at least four protolytic groups, of which at least one is a carboxylic group and at least one a basic nitrogen atom, said mixture having multiple isoelectric points within a pH spectrum of between about 3 to 11 and characterized by the absence of peptide bonds in compounds of said mixture.
2. The process according to claim 1 wherein the ampholytes included in the carrier ampholyte mixture contain hydroxyl groups.
3. The process according to claim 1 wherein the ampholytes included in the carrier ampholyte mixture are nonaromatic.
4. The process according to claim 1 wherein said isoelectric points are separated by between about 1 to 3 pH units.

References Cited
UNITED STATES PATENTS

| | | | |
|---|---|---|---|
| 2,195,974 | 4/1940 | Reppe et al. | 260—534 |
| 2,848,469 | 8/1958 | Kroll et al | 260—534 XR |
| 3,077,487 | 2/1963 | Ramsey et al. | 260—534 XR |
| 2,519,708 | 8/1950 | Schläpfer et al. | 260—514 |
| 2,530,147 | 11/1950 | Bersworth | 260—514 XR |
| 2,761,874 | 9/1956 | Bersworth et al. | 260—514 XR |
| 2,902,447 | 9/1959 | Gunderson et al. | 260—557 XR |
| 3,056,832 | 10/1962 | Stromberg | 260—514 XR |

OTHER REFERENCES

Svensson, Harry, "Isoelectric Fractionation, Analysis, and Characterization of Ampholytes in Natural pH Gradients," Archives of Biochemistry and Biophysics, supplement 1, pp. 132–138 (1962).

JOHN H. MACK, Primary Examiner

G. L. KAPLAN, Assistant Examiner